United States Patent [19]

Sirota et al.

[11] 4,150,098

[45] Apr. 17, 1979

[54] METHOD OF PRODUCING CUBIC BORON NITRIDE

[76] Inventors: Nikolai N. Sirota, Leningradsky prospekt, 78, korpus Ia, kv. 141, Moscow; Anatoly M. Mazurenko, ulitsa Akademicheskaya, 23, kv. 27/5, Minsk, both of U.S.S.R.

[21] Appl. No.: 844,405

[22] Filed: Oct. 21, 1977

Related U.S. Application Data

[63] Continuation of Ser. No. 579,155, May 20, 1975, which is a continuation of Ser. No. 125,289, Mar. 17, 1971, abandoned.

[51] Int. Cl.$^2$ ............................................. C01B 21/06
[52] U.S. Cl. ..................................................... 423/290
[58] Field of Search ......................................... 423/290

[56] References Cited

U.S. PATENT DOCUMENTS 3,212,852   10/1965   Bundy ................................. 423/290

OTHER PUBLICATIONS

Dulin et al.; Soviet Physics, vol. 11, No. 5, Nov. 1969, pp. 1016–1020.

*Primary Examiner*—G. O. Peters
*Attorney, Agent, or Firm*—Holman & Stern

[57] ABSTRACT

A method of producing cubic boron nitride is proposed which consists in that hexagonal boron nitride is subjected simultaneously to the action of a pressure of from about 50 kbar to about 90 kbar and a temperature of at least from about 1800° C. to about 3000° C. during a time period sufficient for formation of a cubic structure.

3 Claims, 1 Drawing Figure

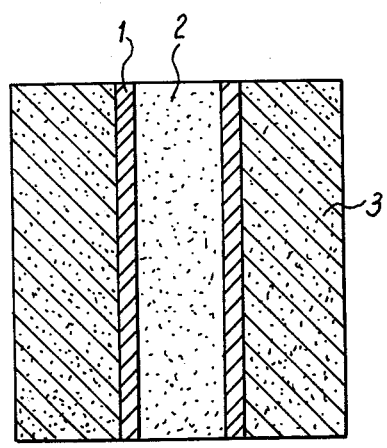

METHOD OF PRODUCING CUBIC BORON NITRIDE

BACKGROUND AND SUMMARY OF THE INVENTION

This is a continuation of application Ser. No. 579,155, filed May 20, 1975 which in turn is a continuation of Ser. No. 125,289 filed Mar. 17, 1971, now abandoned.

The present invention relates to methods of producing superhard materials and, more specifically, the invention relates to methods of producing cubic boron nitride.

The invention can most effectively be used for making cutting elements of tools such as turning tools and cutters, as well as for making drill bits.

Known in the art are methods of producing cubic boron nitride from hexagonal boron nitride by means of a simultaneous action of high pressures and temperatures upon this hexagonal boron nitride during a time period sufficient for forming a cubic structure.

According to the known methods, the process is effected under a pressure of at least about 100 kbar and a temperature of up to 3300° C. The initial material is preferably hexagonal boron nitride containing about 99.8% of boron nitride or a technical product containing about 97% of boron nitride.

The cubic boron nitride obtained by these known methods (the process is carried out without a catalyst) has a light-yellow colour.

The disadvantage of the known methods of producing cubic boron nitride is a high threshold of pressure for conducting the process. The known static pressure apparatus operating within a pressure range above 100 kbar has a useful working volume of about 1 m$^3$ and this limits the yield of the product per cycle and eliminates the possibility of producing large polycrystalline aggregates. The apparatus operating under conditions of such high pressures and temperatures features a limited service life, so that, the above-said known methods are technologically inexpedient.

It is known, furthermore, that when conducting the process within the above pressure and temperature ranges, there is formed not only cubic boron nitride but also boron nitride having the wurtzite structure.

The fact that the product of the synthesis always contains inclusions of boron nitride of the wurtzite structure is one of the obstacles in the way of producing homogeneous polycrystalline aggregates of cubic boron nitride having superior mechanical characteristics. Furthermore, when using this process for producing cubic boron nitride, additional operations are necessary for isolating the boron nitride having the wurtzite structure.

An object of the present invention is to eliminate the above-mentioned disadvantages.

Another object of the invention is to provide a method of producing cubic boron nitride under such pressure and temperature conditions as to make the process technologically expedient and ensure a possibility of producing cubic boron nitride free from insertions of boron nitride having the wurtzite structure.

These and other objects are attained by the present invention in which the process is effected under a pressure from about 50 kbar to about 90 kbar and at a temperature of at least from about 1800° C. to about 3000° C.

To produce cubic boron nitride in the form of a polycrystalline aggregate, the process is preferably effected under a pressure of 60 to 80 kbar during at least one minute.

The most expedient solution of the problem is attained in the case when the initial material consists of preliminarily dried hexagonal boron nitride.

The proposed process effected under the above-said temperature and pressure conditions is technologically expedient and ensures production of cubic boron nitride having no inclusions of boron nitride of the wurtzite structure as well as production of relatively large (depending on the geometric size of the high-pressure chamber employed) polycrystalline aggregates of cubic boron nitride having homogeneous phase composition and superior mechanical characteristics.

BRIEF DESCRIPTION OF THE DRAWING

Other objects and advantages of the invention will be apparent from the following detailed description of an embodiment of the invention, reference being made to the accompanying drawing which is a schematic diagram of a reaction cell for carrying the proposed method into effect.

DESCRIPTION OF THE PREFERRED EMBODIMENTS

The proposed method of producing cubic boron nitride from hexagonal boron nitride, according to the invention, provides for conducting the process under a pressure of from about 50 kbar to about 90 kbar and at a temperature of at least from about 1800° C. to about 3000° C. during a time period sufficient for formation of a cubic modification of boron nitride.

The phase diagram of boron nitride may be used as a theoretical base for producing cubic boron nitride. However, the known phase diagram published in "The Journal of Chemical Physics" vol. 38, N. 5, 1144–1149, 1963 is not quite correct. As follows from the data disclosed, a wurtzite modification of boron nitride appears together with cubic boron nitride. However, the line of the phase equilibrium of the modifications of wurtzite and cubic boron nitride is absent on the above-mentioned diagram as well as the triple point of the three-phase equilibrium of boron nitride. Therefore, corrections are required to this balance diagram within the high-pressure region.

As for the region of pressure below 100 kbar, the boundary of the phase equilibrium of the cubic boron nitride and the hexagonal modification thereof is shown on the diagram incorrectly. The presence of impurities referred to as "catalysts" in the above publication apparently results in the displacement of the line of equilibrium.

The phase diagram of boron nitride in the presence of impurities (catalysts) should be considered as a phase diagram of a multicomponent compound, the surface of the phase equilibrium is of which changed depending on the concentration of the impurities (catalysts).

We have found that in the absence of impurities (catalysts) within the range of pressures below 100 kbar the boundary of the phase equilibrium of the cubic and hexagonal modifications of boron nitride lies within the region of higher temperatures compared with the line of the phase equilibrium given in the known diagram. Therefore, there are thermodynamic facilities for obtaining cubic boron nitride under pressures of 50–90 kbar but within a higher temperature range (1800°–3000° C.) than that given in the publication. This fact was a foundation of the proposed process of producing cubic boron nitride.

The initial product is taken in the form of a technical powder of hexagonal boron nitride (N∼43%, $B_2O_3$∼0.1%, C∼0.6%, B∼54%, other impurities∼2.3%) containing 97–98% of boron nitride. Some of the impurities (inclusions) occurring in small amounts in the initial product (the total content of these does not exceed 2–3% by weight) are probably useful, as they assist in the formation of crystallization centres during the synthesis. We have found, however, that deviations from the stoichiometric composition of the initial and final phases, as a rule, hinder the process of conversion. It is also known that the presence of water and boron oxide in the reaction zone adversely affects the process operation, therefore, these factors should be taken into consideration when effecting the technological process.

The experiments have shown that the initial product should preferably be composed of preliminarily dried hexagonal boron nitride.

The advantages of the proposed pressure and temperature conditions for producing cubic boron nitride by our invention are apparent to those skilled in the art.

In the first place, when using the above-said pressure region, it is possible to obtain cubic boron nitride free from the inclusions of boron nitride of the wurtzite structure which is known to be formed only under pressures exceeding 100 kbar.

In the second place, the process under the proposed pressure and temperature conditions can be effected in known apparatus for creating high pressures and temperatures having a considerable working volume and this provides for a high yield of the product of synthesis for one cycle. Furthermore, apparatus run at a pressure of up to 75 kbar can be used repeatedly and this fact, in turn, provides for a low prime cost of the obtained product.

In the third place, the yield of the product under the proposed conditions of the synthesis, as compared with the known methods of producing cubic boron nitride within the same pressure range by means of catalytic compounds, is increased by a factor of 3 to 4 due to the provision of an additional volume for initial hexagonal boron nitride at the expense of the volume occupied by the catalytic compounds as well as due to the fact that the complete conversion takes place within the sone of reaction of the initial hexagonal boron nitride and not in the places of contact with the "catalyst" compound as in the case of the "catalytic" conversion.

Furthermore, under the proposed conditions of synthesis it is possible to obtain high-strength polycrystalline aggregates of cubic boron nitride following the shape of the reaction volume which are uniform in phase composition and physical and mechanical properties, with the result that the characteristics of these aggregates in some cases overcome the mechanical characteristics of monocrystals of cubic boron nitride.

The cubic boron nitride obtained by the proposed method is usually a fine-grained powder or high-strength polycrystalline aggregate depending on the pressure conditions and the time of synthesis. The product has a dark-grey colour.

EXAMPLE 1

A high-temperature reaction cell is placed into a high-pressure chamber providing for pressures up to 100 kbar. The cell consists of a tubular electric heater 1 (sized $\phi 6 \times 4.5 \times 13$ mm) made of graphite and accommodating an initial sample 2 made of a technical powder of hexagonal boron nitride. Position 3 stands for a solid medium transmitting the pressure and consisting of lithographic stone.

The punches of the chamber are simultaneously used as current conductors to supply electric current to the graphite heater 1. After developing a pressure of 60 kbar within the chamber the heating circuit is switched on and the temperature in the centre of the heater is brought up approximately to 2240° C. (heating absorbed power of 2030 W). These temperature conditions are maintained for 2 minutes, after which the temperature is lowered and the pressure is reduced to atmospheric.

The product of synthesis represents a polycrystalline aggregate of cubic boron nitride having a diameter of approximately 3.5 mm.

The obtained aggregate of cubic boron nitride was used for making a plate which was mechanically fixed in a holder of a turning tool. The comparative tests of the cutting properties of the plate of polycrystalline aggregate of cubic boron nitride and of the known cutter made of a hard metalloceramic alloy (WO∼79%, Co∼6%, TiC∼15%) have shown that during the working of steel (used for making ball bearings) having a conical indentation hardness of HRC=62 units and at a cutting speed of 40 m/min (cutting depth of 0.5 mm, feed 0.1 mm/rev) the wear resistance of the cutter complete with the plate of cubic boron nitride 9–10 times as high as the wear resistance of the known hard-alloy cutter. When increasing the cutting speed of 80 m/min, the wear resistance of the cutter with the plate of cubic boron nitride exceeds the wear resistance of the hard-alloy cutter by a factor of 120 and more. In this case there is obtained 9–10 grade of accuracy of working the surface of the article.

EXAMPLE 2

The sample of hexagonal boron nitride taken from the same industrial batch as the sample of Example 1, was subjected to a pressure of approximately 75 kbar in the above-said high-temperature cell, having a graphite heater sized $6.0 \times 4.5 \times 13$ mm.

The temperature in the centre of the heater was then brought up to approximately 2250° C. (heating absorbed power of 2080 W). These conditions were maintained for 1 minute. There was obtained a polycrystalline aggregate of cubic boron nitride having a diameter of 3.4 mm and a height of approximately 6.5 mm.

The resistivity of the obtained sample is equal to $10^{11}$ to $10^{12}$ ohm. cm. The sample was heated in the air to a temperature of 1400° C. and then was held at this temperature for 1 hour. After cooling the sample, only insignificant surface oxidation was observed. The hardness and cutting properties of the sample obtained after heating remained unchanged.

The X-ray structural study of the polycrystalline aggregate obtained from the synthesis has shown that this aggregate consists of cubic boron nitride having a crystal lattice parameter of a=3.15 Å. The presence of hexagonal boron nitride in the polycrystalline aggregate was not found by the method of X-ray phase analysis.

EXAMPLE 3

A sample of hexagonal boron nitride of $4 \times 10$ mm placed inside a tubular graphite heater (sized $6.0 \times 4.5 \times 13$ mm) was subjected to the action of a pressure of 50 kbar. The heating circuit was then switched on. The temperature in the centre of the sample was brought up to approximately 2210° C. (heating absorbed power of 2020 W). These conditions were maintained for 2 minutes, after which the temperature was decreased and the pressure was reduced to atmospheric.

Fine-grained powder and polycrystalline formations sized 1-1.5 mm and having a dark-grey colour were obtained. The yield of the product was about 40%.

EXAMPLE 4

A sample of hexagonal boron nitride having the same size as the sample in Example 2 was subjected to a pressure of approximately 75 kbar in a high-pressure cell having the same construction and the same size of the graphite heater. The temperature was then brought up approximately to 2260° C. (heating absorbed power of 2080 W). These conditions were maintained for 30 seconds. A fine-grained powder of cubic boron nitride was obtained. The yield of the product was approximately 30%.

EXAMPLE 5

A sample made of technical powder or hexagonal boron nitride having the same size as the sample in Example 3 was subjected to pressure of approximately 55 kbar in a high-pressure cell having a construction similar to that of Example 2 and the same size of the graphite heater. The temperature was then brought up to approximately 2200° C. (heating absorbed power of 2196 W). These conditions were maintained for 2 minutes. Two polycrystalline aggregates were obtained having a size of approximately $\phi 3.4 \times 3$ mm and a fine-grained powder. The yield of the product was about 65%.

We claim:

1. A method of producing cubic boron nitride which comprises subjecting hexagonal boron nitride to the simultaneous effect of a pressure of from about 50 kbar to about 90 kbar and a temperature of at least from about 1800° C. to about 3000° C. in the absence of catalyst for a time period sufficient for forming a cubic structure.

2. A method as claimed in claim 1, in which the process is effected at a pressure of from 60 kbar to 80 kbar during at least one minute, thereby producing cubic boron nitride in the form of polycrystalline aggregate.

3. A method as claimed in claim 1, in which the initial product material is composed of preliminarily dried hexagonal boron nitride.

* * * * *